L. BELL.
REFLECTING TELESCOPE.
APPLICATION FILED AUG. 3, 1918.

1,428,935.

Patented Sept. 12, 1922.
2 SHEETS—SHEET 1.

Inventor
Louis Bell
by [signature]
Attorney

L. BELL.
REFLECTING TELESCOPE.
APPLICATION FILED AUG. 3, 1918.

1,428,935.

Patented Sept. 12, 1922.

Inventor,
Louis Bell
by
Attorney

Patented Sept. 12, 1922.

1,428,935

UNITED STATES PATENT OFFICE.

LOUIS BELL, OF WEST NEWTON, MASSACHUSETTS.

REFLECTING TELESCOPE.

Application filed August 3, 1918. Serial No. 248,107.

*To all whom it may concern:*

Be it known that I, LOUIS BELL, a citizen of the United States, residing at West Newton, county of Suffolk, Commonwealth of Massachusetts, have invented certain new and useful Improvements in Reflecting Telescopes, of which the following is a specification.

This invention relates to telescopes and particularly to reflecting telescopes.

The reflecting telescope has the great merit of being achromatic, that is, or bringing rays of whatever wave length actually to the same surface, and not approximately as in the case of the refracting telescope. It also enables instruments of large aperture and consequent great light gathering power to be constructed at a small fraction of the cost of a refracting telescope of the same light gathering power.

The objections to the reflecting telescope have been, however, somewhat serious as the supports of the auxiliary mirror whether convex as in the Cassegrain, concave as in the Gregorian form or flat as in the Newtonian form, produce troublesome rays about bright objects, thereby destroying the very precise image which might otherwise be obtained. Further, in the Newtonian, the commonest and generally the most serviceable for ordinary purposes, it is necessary to provide means either for rotating the whole body of the telescope in its mounting or rotating the auxiliary mirror and eye-piece about the optical axis of the main mirror in order to be able conveniently to get at the eye-piece in the use of the instrument. Both these devices are difficult to carry out mechanically without disturbing the precise alinement of the optical axis in such a manner as to interfere with the accurate performance of the instrument.

A device for avoiding some of these difficulties due to Sir William Herschel was to tilt the main mirror slightly so as to throw the optical axis obliquely to a focus out of the field of the main mirror where it was viewed by an eye-piece pointing directly along the optical axis. This front view is not conveniently applied to instruments of moderate size and in all cases the obliquity results in aberration of the image to an extent which is serious unless the focal length of the main mirror relative to the diameter be very long.

In my present invention I have recourse to an unsymmetrical parabolic main mirror combined into the Newtonian form by a particular arrangement of the eye-piece and auxiliary mirror which enables me to secure freedom from any serious aberrations, absence of rays due to supports of the auxiliary mirror and the considerable advantage of a rigidly fixed telescope tube.

The principles of my invention and their application in practical embodiment will be more fully set forth in the following specification and are illustrated in the accompanying drawings. Throughout both like reference characters are employed to indicate corresponding parts. In the drawings.

Figure 3:
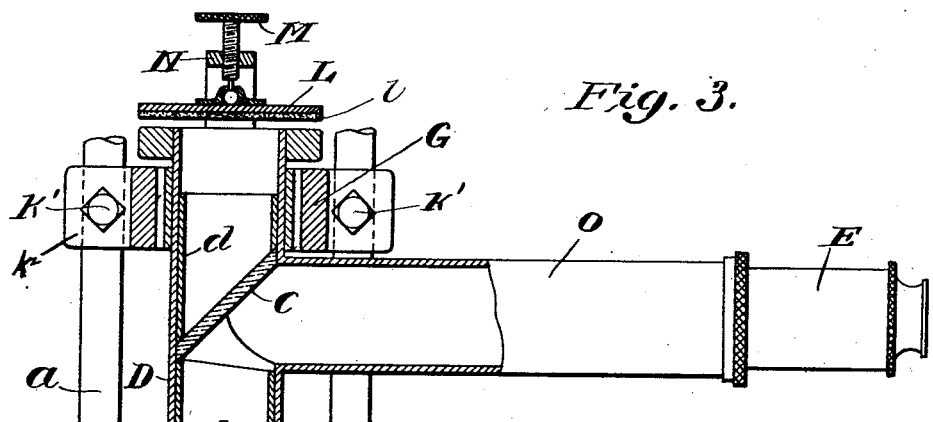

Fig. 3 a view partly in section showing the arrangement of eye-piece and auxiliary mirror.

Figure 4:
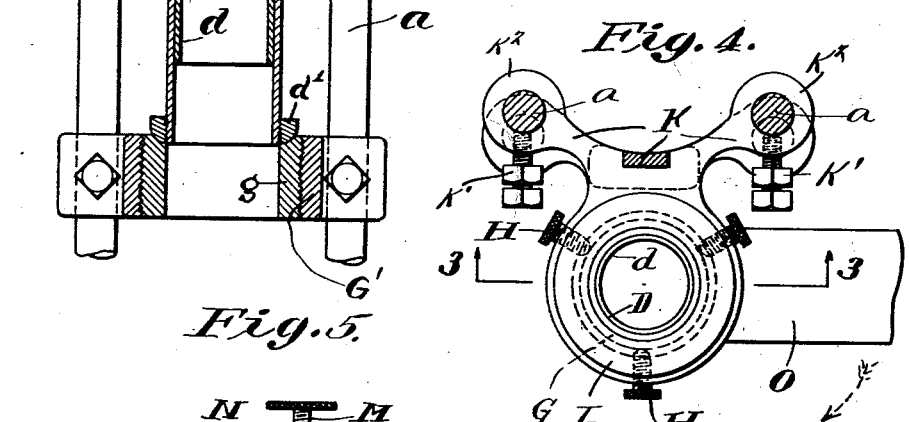

Fig. 4 a partial plan view of the eye-piece and mounting.

Figure 5:
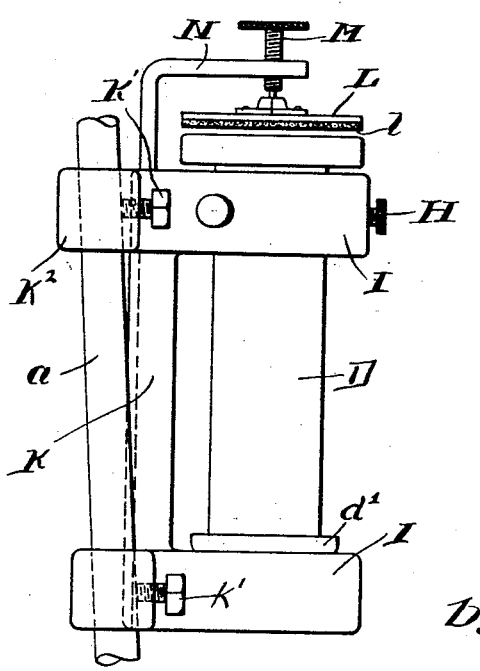

Fig. 5 a side elevation of the eye-piece and

Figure 6:
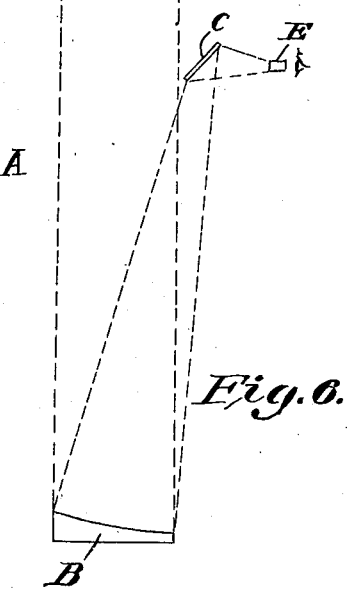

Fig. 6 a diagrammatic view of the mirror and observational system.

Figure 2:
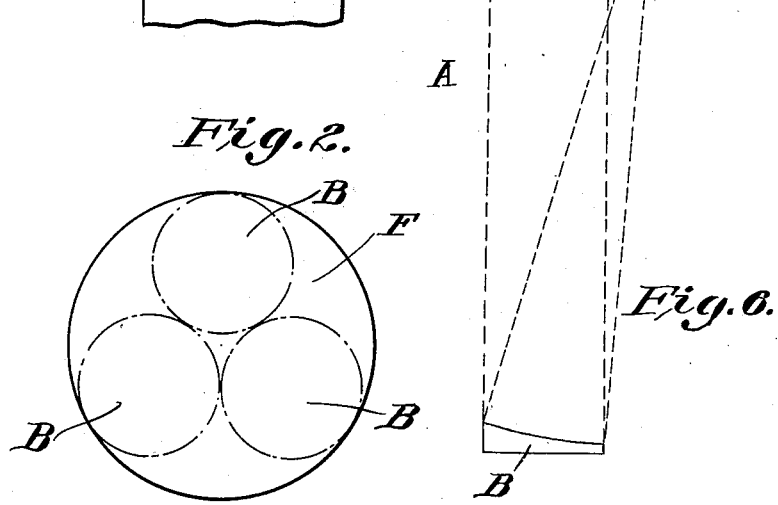
Fig. 2 is illustrative of the nature of the unsymmetrical main mirror herein utilized.

The unsymmetrical main mirror B employed in my invention is a paraboloidal surface such as would be obtained by taking true paraboloidal surface shown in plan in F, Fig. 2, and cutting from it parallel to its axis unsymmetrical mirrors such as B B B. Each of these areas or mirrors B forms its image in the optical axis of F free from all aberrations save those which might be normally due at points away from the axis to the necessary aberration of the parabola. For the purposes of this application the supposititious parabolic surface F will be referred to as the related symmetrical inclusive paraboloid. The resulting aberrations are materially less than in case of tilting a symmetrical paraboloid to form its focal image at the same lateral distance away from its center of figure or in other words the same lateral distance away from the center of a related symmetrical inclusive paraboloid in the same position.

The mirror B therefore has its axis of incidence which is also the axis of the mounting tube A parallel to the axis of the related symmetrical inclusive paraboloid. The incident rays along this axis of the paraboloidal mirror are reflected on account of its asymmetry at an angle in this axis of incidence so that they may be intercepted and observed by a system which need not physically approach the axis of incidence and thus intercept any of the light entering the instrument or obstruct any portion of its field.

In actual construction the unsymmetrical mirror would not actually be cut out of a large paraboloid, but the surface would be figured to produce precisely the same effect. The image therefore is thrown clear of the main mirror when the latter is properly mounted so that the tube A is parallel to the optical axis of the entire paraboloid of which the mirror B may be considered to form a part.

Figure 1:
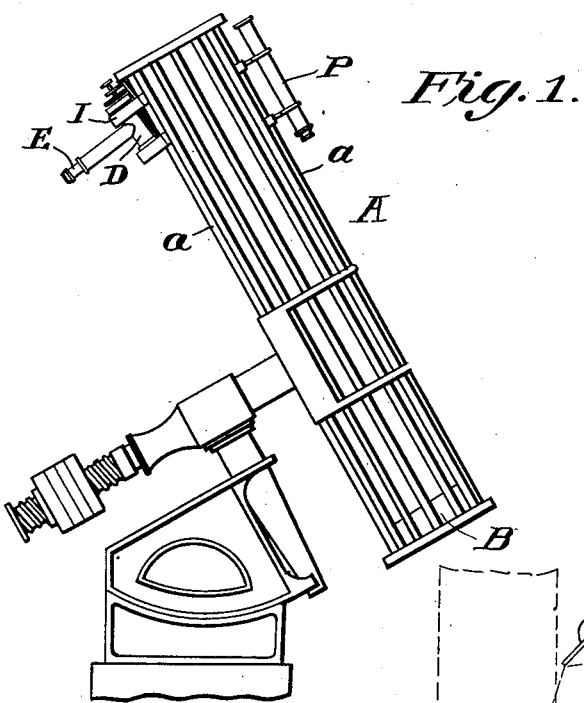
Fig. 1 is a general view of a reflecting telescope in accordance with my invention.

At some convenient point inside the focus of this unsymmetrical mirror B, Fig. 1, carried in the tube A is placed at 45° from the axis of collimation of B, a plane mirror C reflecting the rays at right angles to their original direction and bringing them to a focus at a point where they can be observed through the eye-piece E. Obviously the tube A may be a complete tube or a skeleton tube made up of longitudinal bars $a$ as shown in Fig. 1. The tube may also be carried on any convenient mount such as the equatorial mounting shown in that figure. The mirror C of the observational system is mounted in a sleeve D in adjustable rings G and $G^1$. The upper ring G has preferably a plain tubular bearing while the lower ring $G^1$ has a slight spherical internally shouldered ring $g$ on which the lower end of the sleeve D rests. The sleeve D has, as shown a spherically turned bearing ring $d^1$. The ring G is adjustably mounted by means of the set screws H which are tapped through the upper supporting ring I of the mounting K thus tilting the sleeve D on its spherical lower bearing. This mounting K has bearings $k^2$ which enclose the rods $a$, the mounting being held in place longitudinally of the tube A by clamp screws $K^1$. The mounting further has a clamp plate L having a leather face $l$ which may be screwed down for suitable frictional adjustment of the sleeve D by a knurled screw M working through a bracket N. This plate is shown slightly separated for clearness, but in practice would be screwed down to seat the sleeve D with its beveled lower end lightly pressed against the shoulder of the ring $G^1$. The sleeve D with its mirror C held therein by slip rings $d$ is thus set in the oblique axis of collimation of the mirror B. The sleeve D carries a side tube O with the eye-piece E at its outer end. As indicated by the dotted arrow in Fig. 4, the observational system is capable of being turned through 180° or even slightly more while maintaining the auxiliary mirror C in the oblique axis of collimation of the main mirror B so that the observational system may be adjusted in whatever position of the tube A may secure a wholly convenient position for the observer.

The telescope may be fitted with an ordinary finder such as that shown in Fig. 1 and equipped with various devices for convenience and accuracy. The telescope itself may be in accordance with my invention may be variously modified within the principles herein disclosed and as hereinafter claimed, all without departing from the spirit of my invention.

Having thus described my invention, what I claim and desire to secure by Letters Patent is:

1. In a reflecting telescope an unsymmetrical paraboloidal mirror and an auxiliary mirror inclined to the axis of collimation of said unsymmetrical mirror and capable of rotation in said axis.

2. A reflecting telescope comprising a tube, an unsymmetrical paraboloidal mirror mounted therein, a plane mirror mounted at substantially 45° inclination to the axis of collimation of said unsymmetrical mirror, and rotatable in said axis, and an eye piece supported for viewing the image reflected from said plane mirror and rotatable therewith.

3. A reflecting telescope consisting of an unsymmetrical paraboloidal mirror, a carrying tube therefor extending parallel to the optical axis of the related symmetrical inclusive paraboloid, an oblique mirror rotatably mounted inside the focus of said unsymmetrical mirror, a sleeve rotatably supporting said oblique mirror in the axis of collimation of the unsymmetrical mirror and an eye-piece attached thereto and rotating therewith to observe the image reflected by said auxiliary mirror.

4. In a reflecting telescope, a tube, an unsymmetrical paraboloidal mirror equatorially mounted with respect to the axis of the relatively symmetrical inclusive paraboloid in said tube, and adapted to form its image outside said tube, a plane mirror mounted inside the focus of the unsymmetrical mirror, a sleeve supporting said plane mirror and rotatable about the axis of collimation of said unsymmetrical mirror, bearings for said sleeve attached to said tube, a side tube opening into said sleeve to receive the rays reflected from said plane mirror, and an eye-piece carried by said side tube for observing the image produced by said reflected rays and means for clamping said sleeve at any point in its rotation.

5. In a reflecting telescope, a mounting, an unsymmetrical paraboloidal mirror mounted therein with its axis of incidence parallel to the axis of the related symmetrical inclusive paraboloid, a reflecting element inclined to the axis of collimation of said mirror and intercepting the reflected beam in advance of its focal point, and an eye piece disposed so as to view the focal image determined by the reflecting element.

6. In a reflecting telescope, a mounting, an unsymmetrical paraboloidal mirror mounted therein with its axis of incidence parallel to the axis of the related symmetrical inclusive paraboloid, a reflecting element inclined to the axis of collimation of said mirror and intercepting the reflected beam in advance of its focal point and laterally without the exposed area of the unsymmetrical paraboloid, and an eye piece disposed so as to view the focal image determined by the reflecting element.

7. In a reflecting telescope, an unsymmetrical paraboloidal mirror having its axis of incidence parallel to the axis of the related symmetrical inclusive paraboloid, and a reflecting element mounted in the axis of collimation of said mirror and inclined thereto, and an eye piece disposed to view the focal image determined by said reflecting element.

In testimony whereof I affix my signature in presence of two witnesses.

LOUIS BELL.

Witnesses:
VICTORIA LOUDEN,
MARY V. KEARNS.